Figure 1:
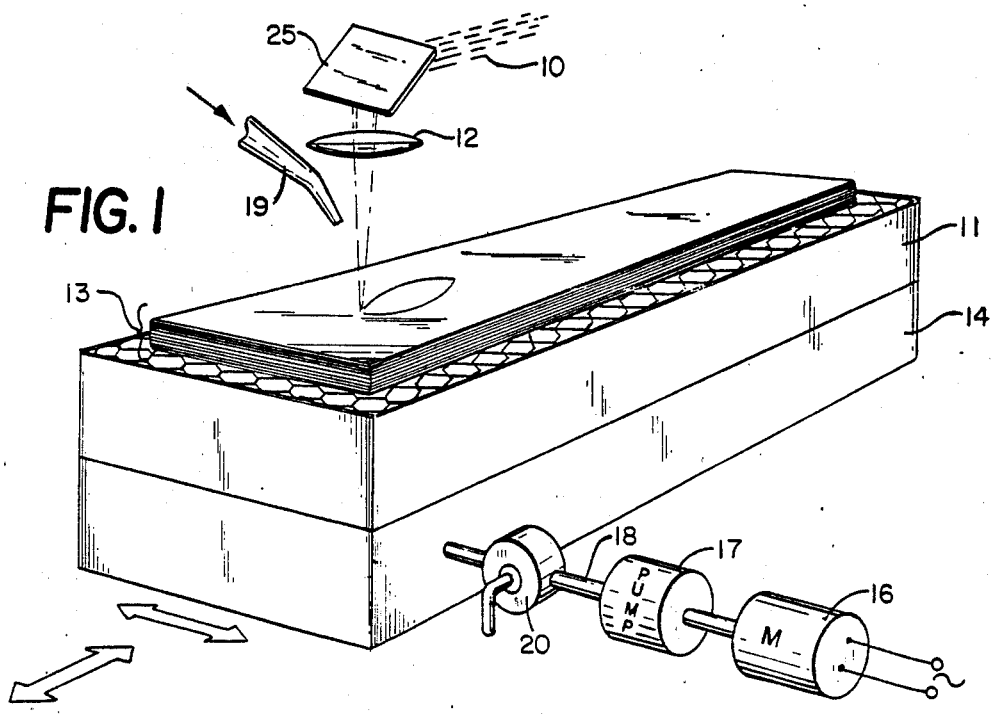

United States Patent [19]

Bauer et al.

[11] Patent Number: 4,680,442
[45] Date of Patent: Jul. 14, 1987

[54] APPARATUS FOR CUTTING MULTIPLE LAYERS OF FABRIC

[75] Inventors: Theodore J. Bauer, Hudson, Wis.; Donald P. Herke, Roseville, Minn.; Edward A. Bork, Star Prairie; William E. Lawson, Somerset, both of Wis.

[73] Assignee: Laser Machining, Inc., Somerset, Wis.

[21] Appl. No.: 848,218

[22] Filed: Apr. 4, 1986

[51] Int. Cl.⁴ .............................................. B23K 26/00
[52] U.S. Cl. ..................... 219/121 LG; 219/121 LN; 219/121 FS
[58] Field of Search ................. 219/121 LG, 121 LN, 219/121 LW, 121 FS; 83/925 CC

[56] References Cited

U.S. PATENT DOCUMENTS

| | | | |
|---|---|---|---|
| 3,612,814 | 10/1971 | Houldcroft | 219/121 L |
| 3,828,159 | 8/1974 | Zoot | 219/121 LM |
| 3,889,095 | 6/1975 | Egan | 219/121 LG X |
| 3,931,491 | 1/1976 | Stumpf | 219/121 LG |
| 4,312,254 | 1/1982 | Pearl | 83/177 |
| 4,434,691 | 3/1984 | LeBlond | 83/56 |
| 4,436,013 | 3/1984 | Gerber | 83/747 |
| 4,462,292 | 7/1984 | Pearl | 83/471.2 |
| 4,463,639 | 8/1984 | Gerber | 83/71 |
| 4,494,433 | 1/1985 | Gerber | 83/374 |

*Primary Examiner*—C. L. Albritton
*Attorney, Agent, or Firm*—Schroeder & Siegfried

[57] ABSTRACT

A mechanism and method for cutting multiple sheets of fabric by a laser beam and removing the smoke and debris from the fabric. The multiple layers of fabric are disposed upon a honeycomb structure that is secured to a vacuum table connected to a vacuum source where the structure includes a plurality of vertically extended openings through which a laser beam is aimed and focused to cut a pattern in the multiple layers of fabric exclusing any impermeable sheets that cover the fabric above and below the fabric. By eliminating the impermeable sheets, the movement of the airstream is directed to flow towards the laser beam and take with it, the smoke and debris from the multiple layers of fabric. When the airstream is directed generally through the opening in the fabric, it assumes a path that moves substantially parallel to the laser beam.

3 Claims, 3 Drawing Figures

U.S. Patent　　　　Jul. 14, 1987　　　　4,680,442

APPARATUS FOR CUTTING MULTIPLE LAYERS OF FABRIC

DESCRIPTION

This invention relates to the cutting of fabric and more particularly to the cutting of multiple layers of fabric by a laser beam.

BACKGROUND OF THE INVENTION

The use of laser beams for cutting fabric has been in operation for some time. Generally speaking, a single sheet of fabric is cut in which a vacuum source and vacuum table are used to support the fabric. That is, a honeycomb cellular structure is used that absorbs some of the heat and energy created by the laser beam when it is used to cut the fabric. The honeycomb structure is placed over a vacuum table that is connected to a source of vacuum pressure. However, there have been numerous problems evolved from cutting multiple layers of fabric in which covering sheets of plastic have aided the cutting process.

DESCRIPTION OF THE PRIOR ART

There are various ways of cutting the sheets of fabric which amount to using a reciprocating cutting blade much like a jig saw as found in U.S. Pat. No. 4,494,433, entitled "Apparatus For Working On Sheet Material And Having Movable Vacuum Chamber". This patent describes the material to be cut as single sheet material.

Another approach to the subject is disclosed in U.S. Pat. No. 4,462,292 entitled "Apparatus for Cutting and Notching Sheet Material" in which a cutting tool in the form of a cutting wheel engages the sheet material spread over a support surface. Again, this structure makes use of a single sheet of material that is being cut.

Because the cutting operation is described generally as a delicate cutting movement, another approach is to dither the blade about the axis of reciprocation in synchronism with the reciprocation strokes of the blade. This is disclosed in U.S. Pat. No. 4,436,013 entitled "Reciprocating Cutting Apparatus With Theta Dither".

Another approach to cutting several layers of material is that disclosed in U.S. Pat. No. 4,434,691 entitled "Method and Apparatus for Sealing cut Sheet Material" in which a vacuum system holds the material in a compressed state on the support surface during cutting and an airimpermeable overlay is spread on top of the cut material to seal the material and prevent leakage into the vacuum system. This is accomplished through the use of rolls of MYLAR ® material for the simple steps of stopping horizontal flow of air between the active and inactive zones on the cutting table created through the vacuum air flow.

Another approach to coping with the problem is that found in U.S. Pat. No. 4,312,254 entitled "Fluid Jet Apparatus for Cutting Sheet Material" in which a jet of fluid material is used under pressure between 10,000 psi and 100,000 psi in which the sheets of material such as cloth may be sandwiched between sheets of expendable air impervious material, as for example sheets of polystyrene film. These polystyrene sheets prevent air from being drawn into the layup of material from the atmosphere and enable the layup of material to be compressed more firmly into a substantially rigid mass when air is evacuated therefrom by the vacuum device. However, the fabric does become wet and the fluid jet has several disadvantages. Where the sheets of plastic material are placed over and under the multiple layers of fabric to be cut, a mass of metal wool or entangled wire may be used below the fabric to aid in absorbing the energy from a high velocity fluid jet which emanates from the nozzle above.

Generally when several layers of fabric are to be cut, there are problems associated with the use of a laser cutting beam in burning the pattern into the stack of fabric material. For instance, upon a laser beam cutting material through a burning process, the smoke and debris tends to back up into the layers of material, particularly if they are covered by an air impervious material such as MYLAR ® or plastic. That is, the smoke and debris tends to follow the layers of fabric and as the vacuum is increased, the smoke and debris follow the generally flat layers of the fabric until reaching the cut area. However, if the plastic material is removed the cutting process is enhanced and the layers of fabric are still drawn together through the vacuum created in the vacuum table below the stacks of fabric.

U.S. Pat. No. 3,612,814 entitled "Cutting Processes Employing A Laser" discloses a single sheet of fabric being cut by a laser beam and further describes a system for cutting metal in which an exothermic reaction is created using an oxygen atmosphere.

It is therefore a general object of the present invention to provide improved apparatus for cutting multiple layers of fabric with a laser beam.

It is yet another object of this invention to provide means for pulling the smoke and debris from multiple layers of fabric cut into patterns.

It is a further object of this invention to provide means for drawing multiple layers of fabric together and aid in the pattern cutting process when using a laser beam.

It is yet another object of this invention to provide means for cutting multiple layers of fabric in which plastic sheets are excluded from the outer layers of the stack of fabric.

It is another object of this invention to cause the smoke and debris in multiple layers of fabric to be drawn along the layers of fabric toward the cut made by the laser beam.

It is still another object of this invention to cause the smoke and debris to be drawn between multiple layers of fabric stacked to be cut towards the laser cut and substantially parallel with the laser beam.

Figure 2:
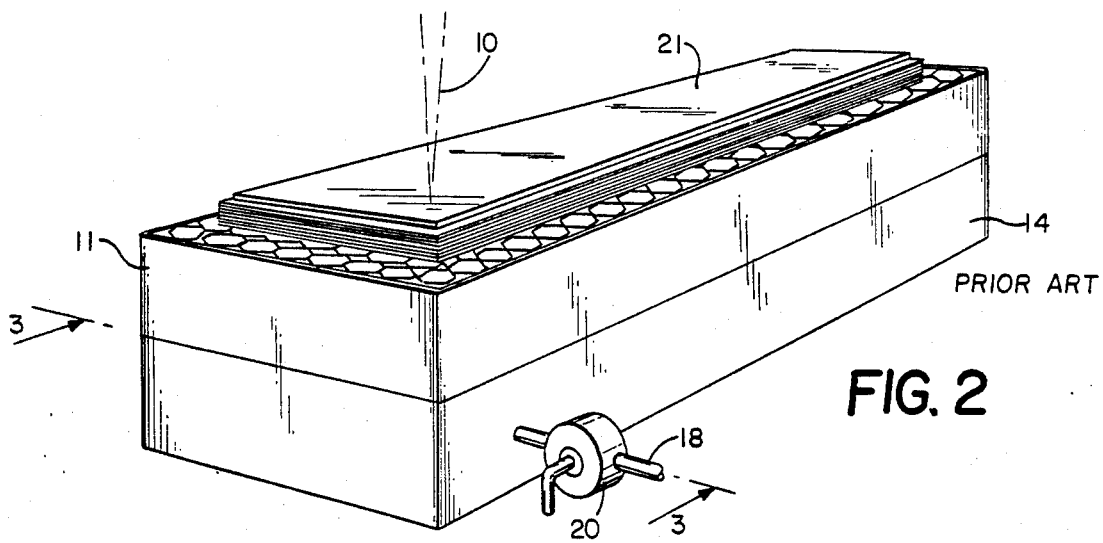
Figure 3:
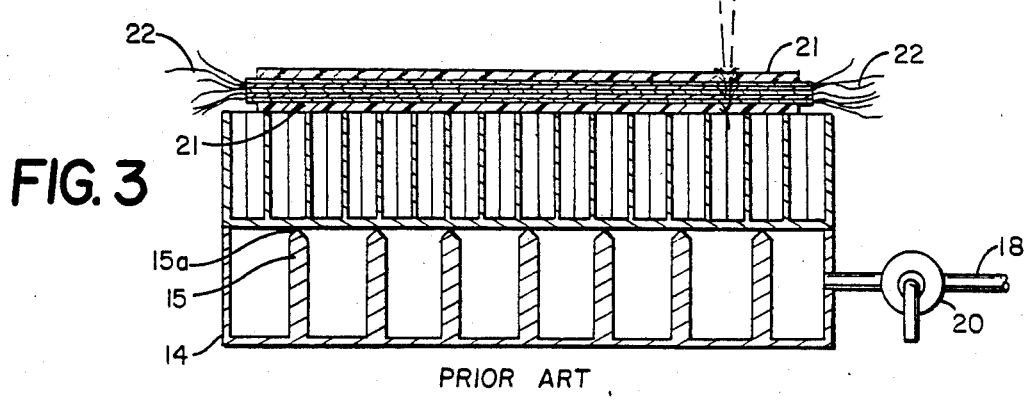

These and other objects and advantages of the invention will more fully appear from the following description, made in connection with the accompanying drawing, wherein like reference characters refer to the same or similar parts throughout the several views, and in which:

FIG. 1 is a diagramatic view of my invention;
FIG. 2 is a diagramatic view of the prior art; and
FIG. 3 is a cross-sectional view of the prior art.

Turning now to FIG. 1, there is disclosed a $CO_2$ laser beam 10 which may develop up to 1500 watts of power that is focused in an appropriate spot on the surface of a honeycomb cellular structure 11. That is, the laser beam is operated in the TEMoo mode of operation and this is by way of example only, and not to be construed as a limitation upon the invention. When the focused beam is scanned across the surface of the honeycomb structure 11 at a rate of approximately 600 inches per minute for a 1500 watt beam, or at a lower rate of 200 inches per minute for a 600 watt beam, an adequate cutting rate is developed. Of course, beam 10 will roughen or mar the surface of the honeycomb structure 11 as the cutting operation takes place. Of course, the laser beam 10 is focused through the use of a long focal length lens 12 that usually is a 5 inch lens for maximum energy density over a full thickness of a layup 13 made up of multiple layers of a limp fabric in a flat relationship.

The Laser beam 10 is focused at ⅛ to ½ inch below the last sheet of fabric that is placed upon the honeycomb structure, and may be reflected by an aluminized mirror 25 before passing through lens 12.

In some applications, it may be desirable to give some additional protection to the lens 12 through the use of additional air pressure 19 directed along the laser beam 10.

In reference to the honeycomb structure 11, the term honeycomb as defined herein is not limited to hexagonal cells but rather is used to denote a cellular or spaced baffle-like structure made up of relatively thin walls defining a number of vertically oriented cavities. The honeycomb structure of course, is non-reflective and collects the excess energy that is spun away from the laser beam after cutting the multiple layers of fabric.

A vacuum table 14 is disposed beneath the honeycomb structure 11 and generally has upright extending support members 15 with a rather pointed end or edge 15a that communicates with the honeycomb structure. It is very important that the airflow through the honeycomb structure has a uniform vertical flow as well as that through all the layup material formed by the multiple layers of fabric. Thus, where there is no seal on the upper or lower surface of the multiple layers of fabric 13 and when any smoke is created by the cutting action of the laser beam 10, the smoke is reduced in volume rather than being spread where a seal is created at the top and bottom of the fabric forming the layup. Where a seal is present, the smoke is spread between the layers of fabric. The fabric must also be held loose enough so that upon cutting with the laser beam 10 the edges of the fabric do not fuse to each other during the cutting process.

As seen principally in FIG. 1, a motor 16 is energized by an electrical source and is used to drive a vacuum pump 17 and in the diagram shown, pump 17 is connected to vacuum table 14 through a vacuum line 18. It has been found that a proper vacuum for correct airflow occurs between 1 and 4 inches of $H_2O$ and that generally the amount of vacuum is no greater than 1 inch $H_2O$.

A valve 20 is connected in vacuum line 18 to give further aid in controlling the amplitude of vacuum required in vacuum table 14.

As disclosed principally in FIGS. 2 and 3, a plastic sheet or cover 21 is disclosed that produces the additional drawing together of the fabric, and causes the smoke and debris to be pushed sideways from the cutting beam 10, all of which contributes to getting rid of the smoke and debris.

It will, of course, be understood that various changes may be made in the form, details, arrangement and proportions of the parts without departing from the scope of the invention which consists of the matter shown and described herein and set forth in the appended claims.

What is claimed is:

1. In combination in a laser cutting aparatus for cutting multiple sheets of fabric into patterns, the improvement comprising:
    (a) a table having a plurality of knife edge support members extending upwardly and disposed to support a honeycomb structure;
    (b) a honeycomb cellular structure having heat absorbing characteristics and having multiple vertically extending openings formed therein permitting substantially vertical airflow therethrough, said honeycomb structure being constructed and arranged to support multiple layers of limp fabric in flat contiguous relationship while said airflow moves through said openings;
    (c) a source of vacuum pressure including vacuum pressure regulating means having at least a negative pressure of 5 inches $H_2O$;
    (d) a focused laser beam directed downwardly from above said honeycomb structure and the layers of fabric, for burning a pattern in the multiple layers of fabric;
    (e) a vacuum table supporting said honeycomb cellular structure and connected to said source of vacuum pressure, said airstream movement increasing as a result of said laser beam cutting the fabric and thereby creating an increase in air movement substantially in line with said laser beam; and
    (f) said laser cutting apparatus being devoid of layer separating and liquid spraying means adjacent the focus of said laser beam.

2. In combination in a laser cutting apparatus for cutting multiple sheets of fabric into patterns, the improvement comprising:
    (a) a table having a plurality of knife edge support members extending upwardly and disposed to support a honeycomb structure;
    (b) a honeycomb cellular structure supported by said support members and having heat absorbing characteristics and having multiple vertically extending openings formed therein permitting substantially vertical airflow therethrough;
    (c) a source of vacuum pressure;
    (d) a focused laser beam directed downwardly from above said honeycomb structure;
    (e) a plurality of layers of limp fabric superimposed upon each other in flat contiguous relationship adjacent the focus of said laser beam and produced by airflow moving through said layers of fabric into the openings in said honeycomb structure;
    (f) a vacuum table connected to said source of vacuum pressure, and supporting said honeycomb cellular structure in fluid communicating relationship, said airstream movement increasing when said laser beam is cutting the fabric and creating an increase in air movement substantially in line with said laser beam; and
    (g) said layers being devoid of liquid spraying mechanism directed at the cutting area of said focused laser beam.

3. A method of cutting multiple sheets of fabric into patterns consisting in:
    (a) providing a table having a plurality of knife edges supporting a honeycomb cellular structure with multiple vertically extending openings formed therein and having a source of vacuum connected thereto;
    (b) spreading a plurality of overlying layers of limp fabric across the upper surface of the cellular structure in supported relation and with their adjacent surfaces in contiguous relation with each other;
(c) directing a focused laser beam at the layers of fabric with its focus adjacent to and below the upper surface of the cellular structure supporting said fabric layers to cut the fabric layers into patterns; and
(d) maintaining the adjacent surfaces of the fabric layers during the cutting operation in dry condition and in contiguous relation throughout their length without spacer means therebetween and without utilizing a stream of liquid directed at the cutting area of the laser beam.

* * * * *